United States Patent [19]

de Vries

[11] Patent Number: 4,830,178
[45] Date of Patent: May 16, 1989

[54] CONVEYOR DEVICE

[75] Inventor: Hugo V. de Vries, Ermelo, Netherlands

[73] Assignee: Elten Nederland B.V., Barneveld, Netherlands

[21] Appl. No.: 58,575

[22] Filed: Jun. 5, 1987

[30] Foreign Application Priority Data

Jun. 6, 1986 [NL] Netherlands .................. 8601467

[51] Int. Cl.<sup>4</sup> ............................. B65G 25/02
[52] U.S. Cl. ................................ 198/774; 414/277; 414/525.5
[58] Field of Search ............. 198/774, 773; 414/267, 414/277, 525 B

[56] References Cited

U.S. PATENT DOCUMENTS

| 3,838,769 | 10/1974 | Fishburne et al. | 198/774 X |
|---|---|---|---|
| 3,985,496 | 10/1976 | Eickelberg | 198/774 X |
| 4,009,774 | 3/1977 | Lutz | 198/773 |
| 4,357,128 | 11/1982 | Gooden et al. | 198/774 X |
| 4,427,331 | 1/1984 | Grebenstein et al. | 414/277 |
| 4,556,385 | 12/1985 | Denis | 198/774 X |
| 4,684,311 | 8/1987 | Dickson-Wright et al. | 198/774 X |

FOREIGN PATENT DOCUMENTS

| 35818 | 9/1981 | European Pat. Off. |  |
|---|---|---|---|
| 2936532 | 3/1981 | Fed. Rep. of Germany . |  |
| 3508792 | 9/1985 | Fed. Rep. of Germany | 198/774 |
| 2307727 | 4/1976 | France . |  |
| 2041321 | 9/1980 | United Kingdom | 414/525 B |
| 2173468 | 10/1986 | United Kingdom | 414/525 B |

Primary Examiner—Robert J. Spar
Assistant Examiner—D. Glenn Dayoan
Attorney, Agent, or Firm—Ladas & Parry

[57] ABSTRACT

A conveyor system is described, adapted for application in a storage rack, consisting of a plurality of stories with a plurality of storage tracks (0) side by side in each story, each storage track (0) containing a conveyor device. The conveyor system is characterized in that each conveyor device consists of two or more and independently and separate working conveyors (2).

7 Claims, 4 Drawing Sheets

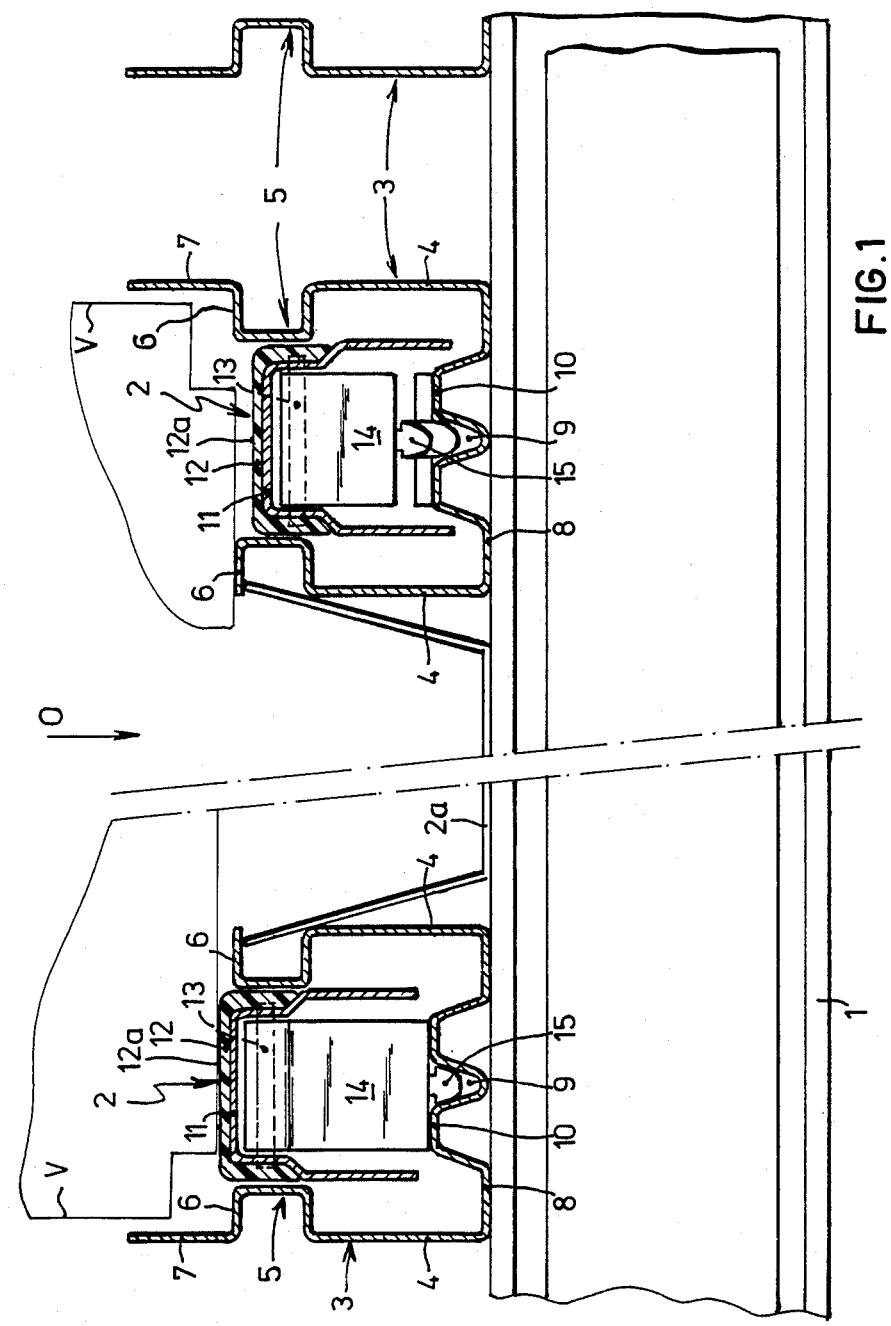

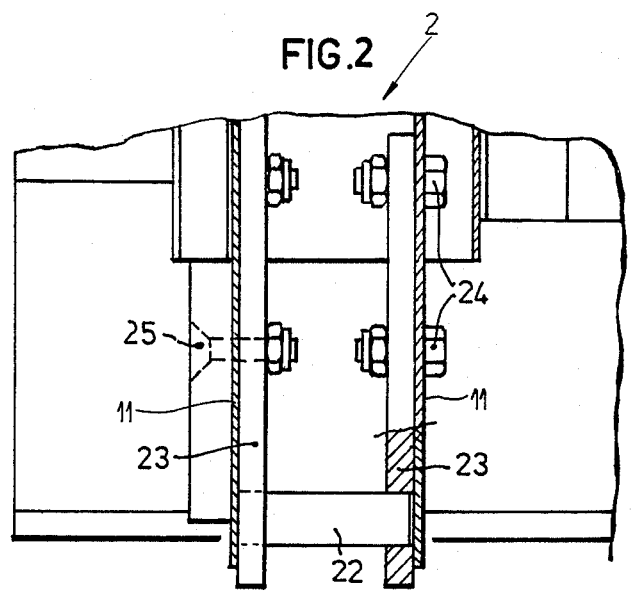
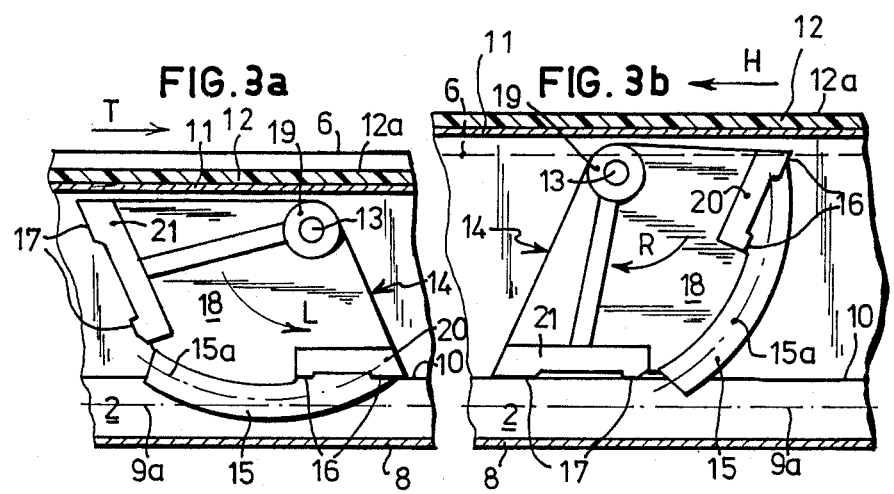

CONVEYOR DEVICE

The invention relates to a conveyor device for a storage rack having a plurality of levels or stories with a plurality of storage tracks side by side in each story, each storage track containing a conveyor device.

Storage racks of the above-described type are used on a large scale by dairies, bakeries, breweries, softdrink manufacturers and the like. The conveyor devices in the storage tracks of these storage racks have substantially flat, one-piece upper surfaces, which mainly support the center part of the dairy, bread, beer, softdrink, or like products in boxes, crates, cases, or the like. Such storage and conveyance of such objects, which have flat under surfaces, does not present difficulties. When, however, objects with convex bottoms or vertically disposed tall objects, such as barrels or stacks of crates, boxes and the like, respectively, are to be stored and conveyed, these objects have poor stability on such a conveyor device having a one-piece flat upper surface. In the storage and conveyance of stacks of crates, moreover, the bottom crate must carry such a relatively large load as may rupture the crate.

Also, in the storage and conveyance of relatively wide objects on a conveyor device with a relatively narrow, one-piece upper surface, the bottoms of the objects may sag over either or both sides of the conveyor device. This may hamper their conveyance.

The object of the invention is to overcome such objections to the above-described, known conveyor devices.

This object is attained, according to the invention, by a conveyor device which has two or more separate and independently operable conveyors.

By applying this measure, and spacing the conveyors so that objects are supported thereby by their side edges or outer portions, objects with convex or irregularly shaped bottoms have much better stability than when supported at their centers on a one-piece flat supporting surface.

The support of, for example, a stack of (filled) crates by two conveyors spaced to carry the stack at the side edges of the bottom crate provides much greater resistance to rupture of the bottom crate, and the stack can even remain standing with some rupture thereof. Trays with low side walls have substantially sagging bottoms when supported near their side edges by two separate conveyors, but such sagging can be large without interfering with their storage or conveyance. Further, by having two separate conveyors for one storage track, suitably contained objects to be conveyed may even be disposed between the conveyors, as a result of which a considerable vertical space-saving is attained. Similarly, when there are no objects on the conveyors, one may easily get between the conveyors to do maintenance, repairs, cleaning and the like.

In a preferred embodiment of the conveyor device according to the invention, longitudinal guides for the objects to be conveyed are situated at the outside edges of the conveyors of each conveyor device and storage track. The longitudinal guides can be below the conveyor surfaces. This embodiment is pre-eminently suitable for the storage and conveyance of so called Tetra-H-crates, which are H-shaped in end view. These can straddle the conveyors and be guided by said longitudinal guides at the inner sides of the lower legs of the H-shape of the crates.

With a particularly efficient embodiment of the conveyor device according to the invention, the longitudinal guides are reversible. In one position, they extend above the supporting surfaces of the conveyors, and in the reversed position, they extend below the supporting surfaces. In the one position, these longitudinal guides guide block-shaped crates, while in the reversed position, they guide the Tetra-H-crates, as described above. Another advantage of this embodiment is that users of the block-shaped crates who want to switch to H- or Tetra-H-crates do not have to replace their whole stock of block-shaped crates at one time. This replacement may occur gradually, if desirable, even by the crates for one storage track at a time, because the longitudinal guides can be switched easily and quickly from the position for use of block-shaped crates to the position for use of Tetra-H-crates, or vice versa.

The reversible longitudinal guides consist of half of a U-shaped profile, the leg of which is, therefore, resiliently movable with respect to the base of the U.

BRIEF DESCRIPTION OF THE DRAWING

The invention will be elucidated by a few embodiments shown in the drawing, in which:

FIG. 1 is a front cross-sectional view of one embodiment of the conveyor device according to the invention;

FIG. 2 is a plan view of a portion of the embodiment of FIG. 1, showing a connector for one of the conveyors thereof to a driving device therefor;

FIG. 3A and 3B are side views, partly in section, of one conveyor of the embodiment of FIG. 1, showing a toppling cam thereof in rest and conveyance positions, respectively;

DESCRIPTION OF THE DRAWN EMBODIMENTS

Figure 4:
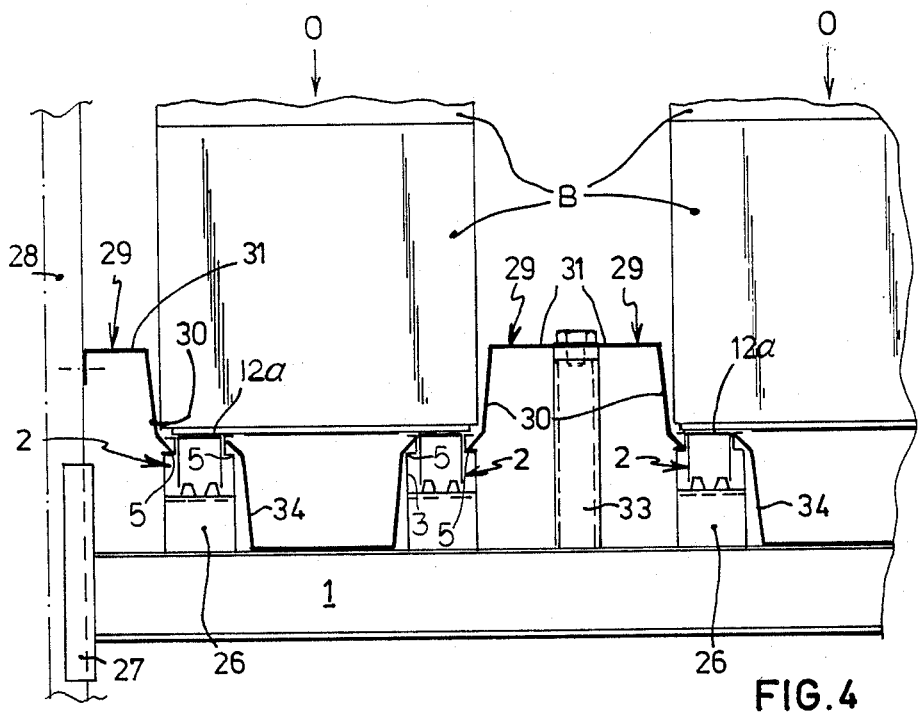
FIG. 4 is a front view of a second embodiment of a conveyor device according to the invention for box-shaped crates.
Figure 5:
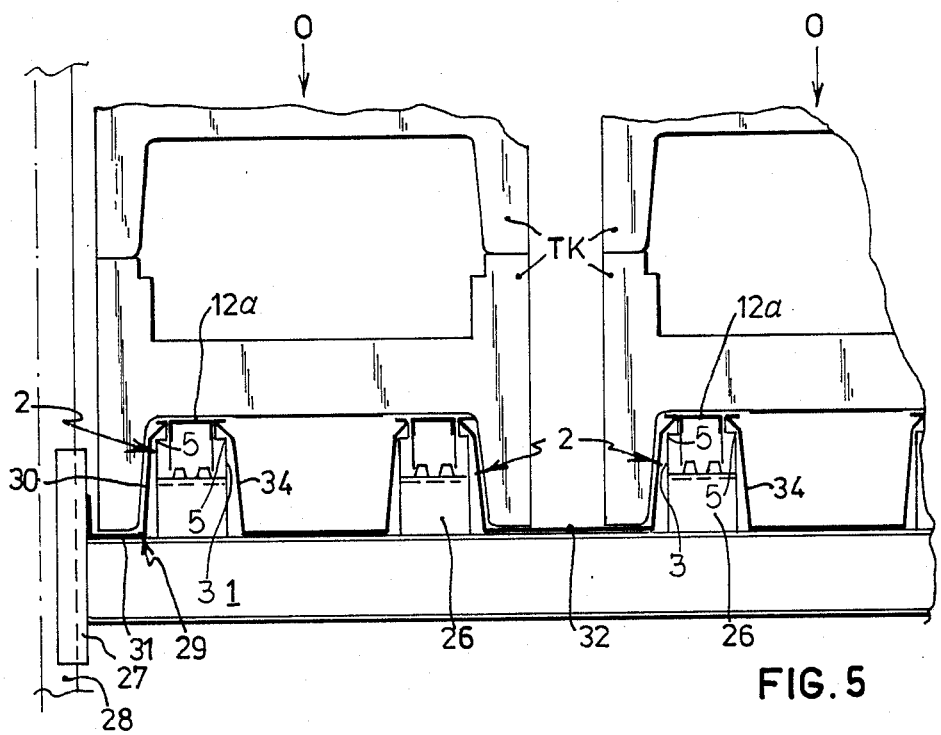
FIG. 5 is a front view of a third embodiment of the conveyor device according to the invention for Tetra-crates.

FIG. 1 shows a conveyor device in one storage track at O of a storage rack divided into stories by horizontal supporting beams 1 (only one shown), the longitudinal extremities of which are supported on vertical pillars (not shown, one (28) shown in FIGS. 4 and 5). In each story, a plurality of such storage tracks lie side by side.

The conveyor device has two, separate and independently operable conveyors at 2, which are mirror images of each other and, therefore, correspondingly referenced. Other embodiments may have more than two conveyors. The conveyors are step conveyors.

Each step conveyor at 2 has a U-shaped supporting beam 3 with a bottom 8 on the horizontal supporting beam 1 of the conveyor device and legs 4 projecting from the latter. The legs 4 have facing, U-shaped supports 5 with supporting faces 6 for objects V (only portions of one being shown) to be conveyed.

Between the step conveyors at 2 is a member 2a with a gutter-shaped profile, the bottom of which rests on the horizontal supporting beam 1 and the free edges of the side walls of which extend into the U's of the U-shaped supports 5 of facing legs 4 of the U-shaped supporting beams 3 of the step conveyors at 2. The gutter-shaped members 2a are used, for example, for catching leakage liquid and/or other things from the objects.

The bottom 8 of each U-shaped supporting beam 3, inside the U-shape thereof, is provided with a V-shaped groove 9 in the center flanked by guide surfaces 10 on opposite sides thereof. The function of these will be explained later.

At least one conveyor 2 may be laterally displaceably mounted on the horizontal supporting beam 1. For example, bolts (not shown) fixed to the bottom 8 of the U-shaped supporting beam 3 may be displaced and then fixed in slots (not shown) in the horizontal supporting beam 1.

Each step conveyor at 2 has an inverted U-shaped conveyor beam 11 between the legs 4 of its U-shaped supporting beam 3, the upper side of which is covered by an inverted U-profile 12, which is made of plastic. The legs of the U-profile 12 serve as slide bearings between the conveyor beam 11 and the U-shaped supports 5 of the legs 4 it is between. The top 12a of the U-profile forms the object-conveying surface of the conveyor.

As shown for one conveyor beam 11 in FIGS. 3a and 3b, toppling cams at 14 (only one shown) are pivotable mounted on the bottom side of each conveyor beam 11 with respective bearing sleeves 19 (only one shown) about pivot shafts 13 (only one shown), which extend between the legs of the U-shape of the conveyor beams. Each toppling cam 14 has a spiral engagin member 15, the transverse cross-section of which is substantially trapezium-shaped, but with convex flanks to correspond, for example, to a tooth of a gear. It cooperates with the V-shaped groove 9 in the bottom 8 of the U-shaped supporting beam 3. Due to this cross-sectional shape of the spiral engaging member 15, its friction with the side walls of the V-shaped groove 9 in the bottom 8 of the supporting beam 3 is larger than it would be if the spiral engaging member 15 had flat flanks.

The longitudinal spiral of the engaging member 15 transverse to the axis of the pivot shaft 13 is a logarithmic curve. It is the object of this to keep the ascending angle of the spiral engaging member 15 to the V-shaped groove 9 constant when the radial distance between the V-shaped groove 9 and the axis of the pivot shaft 13 changes as the toppling cam 14 pivots on the pivot shaft 13.

At both sides of the opposite longitudinal ends of each spiral engaging member 15 are slide feet 20 and 21 with slide faces 16 and 17, respectively, which cooperate with the guide surfaces 10 on the opposite sides of the V-shaped groove 9 in the bottom 8 of the U-shaped supporting beam 3. The slide faces 16 and 17 enclose an angle of from 90° to 135°. The slide face 17 is at a larger radial distance from the pivot shaft 13 than the slide face 16, because the spiral of the engaging member 15 increases the radial distance between the engaging member 15 and the pivot shaft 13 in the direction from the slide foot 20 and its slide faces 16 to the slide foot 21 and its slide faces 17.

The center of gravity of the toppling cam 14 lies at such a position that the toppling cam tends to rotate from the position shown in FIG. 3a in the direction of arrow L and to rotate from the position shown in FIG. 3b in the direction of arrow R. The lines along which the spiral engaging member 15 and the walls of the V-shaped groove 9 cooperate are indicated at 15a,19a, respectively, in FIGS. 3a and 3b.

For this, the toppling cam 14 has a web 18 from which the spiral engaging member 15, bearing sleeve 19 and slide feet 20 and 21 extend transversely, the slide faces 16, 17 being on the sides of the latter which are away from the bearing sleeve 19.

As shown in FIG. 2, the step conveyors at 2 are also provided with a coupling pin 22, which is connected solidly between the legs of the U-shaped conveyor beam 11 by strips 23 and bolts 24 and 25. The coupling pin 22 is connectable to a driving device (not shown).

The step conveyors at 2 work in the following manner:

In the position shown in FIG. 1, on the right, and in FIG. 3a, with the article V in a state of rest on supporting faces 6, the slide faces 16 of the coupling cams 14 rest on the guide faces 10 of the bottom 8 of the U-shaped supporting beam 3. That is, the top conveyor face 12a of the profile 12 on the conveyor beam 11 is lower than the supporting faces 6 of the support 5 and the conveyor beam 11 and profile 12 move under the object V, back from its prior position, in the direction of arrow T in FIG. 3a. This is, therefore, the reverse stroke of the conveyor beam.

At the start of the succeeding, opposite, forward stroke, which is the working or object-advancing stroke in the direction of the arrow H in FIG. 3b, the toppling cam 14 rotates, first as a result of gravity, from the position according to FIG. 3a in the direction of arrow L until the lines 9a and 15a of cooperation between the V-shaped groove 9 and spiral engaging member 15 coincide to establish the friction coupling between the spiral engaging member 15 of the toppling cam 14 and the V-shaped groove 9 of the U-shaped supporting beam 3. During the following, further forward stroke of the conveyor beam 11 in the direction H, the toppling cam 14 is turned in the direction of arrow L by the friction between the spiral engaging member 15 and V-shaped groove 9, until the slide faces 17 rest on the guide faces 10. This pushes the conveyor beam 11 upwardly, until the conveyor face 12a is higher than the supporting faces 6. Then the object V is supported by the top conveyor face 12a, as shown on the left in FIG. 1, and conveyed by the conveyor beam 11 to the end of the forward stroke.

At the succeeding beginning of the reverse stroke, in the direction T of FIG. 3a, the toppling cam 14 first rotates, as a result of the gravity, in the direction of arrow R in FIG. 3b until the spiral engaging member 15 again comes into frictional engagement with the V-shaped groove 9 along lines 15a, 9a. During further reverse stroke in the direction T, the toppling cam 14 then continues rotation in the direction of arrow under friction until the slide faces 16 rests on the guide faces 10 as shown in FIG. 3a. Thereby the conveyor face 12a has moved again to a lower level than the supporting faces 6 while the reverse stroke in direction T is being completed.

The slide faces 16 and 17 and the spiral engaging member 15 are disposed and shaped such that the transitions from the slide face 16 to the spiral engaging member 15 and from the spiral engaging member 15 to the slide face 17 on the U-shaped supporting beam 3, and the other way round, proceed gradually and without shocks.

FIGS. 4 and 5 show the same conveyor device elements according to invention in two embodiments. The embodiment of FIG. 4 is adapted for the storage and the conveyance of usual, block-shaped crates B, but the embodiment according to FIG. 5 is adapted for the storage and the conveyance of Tetra-H-crates TK. The embodiments according to FIGS. 4 and 5 are both meant for the storage and conveyance of stacks of two or more crates, as shown, but the crates may also be stored and conveyed unstacked.

In the embodiments of both FIGS. 4 and 5, the conveyor device in each storage track O consists of two step conveyors at 2, as before, but these are supported by consoles 26 on the supporting beams 1 (only one shown). The supporting beams 1 are applied to vertical pillars 28 by supports 27. The function of the consoles 26 will now be further explained.

According to FIGS. 4 and 5, there is a longitudinal guide 29 for both the crates B and TK to be conveyed on the opposite outsides of the conveyors at 2 in each storage track O. This longitudinal guide is reversible, as seen by comparison of FIGS. 4 and 5. Each consists of half of a U-shaped profile having a leg 30 which is resiliently movable with respect to a base 31. The bases of two such, adjacent half U-profile guides 29 may also be connected to each other by a seam 32, as shown in FIG. 5, to form a one-piece U-profile.

According to FIG. 4, the half U-profile longitudinal guides 29 are disposed in reversed position, with the legs 30 extending upward and one side of the bases 31 fixed to the pillars 28 (only one shown) or a corresponding central support 33 between the conveyors of adjacent storage tracks O. Because the legs 30 are resiliently movable with respect to the bases 31, the free edges of the legs 30 may resiliently extend into the U-shaped supports 5 in the legs of the U-shaped supporting beams 3. With the position of the half U-profile 29 longitudinal guides shown in FIG. 4, the legs 30 thereof form longitudinal guides for block-shaped crates B.

With the embodiment according to FIG. 5, the half U-profile longitudinal guides 29 are mounted in a reversed position with respect to the position according to FIG. 4. In this case, therefore, their legs 30 extend lower than the conveyor face 12a of the conveyors at 2 to adapt the longitudinal guides 29 for the cross beams of the Tetra-crates TK while the conveyor face 12a conveys the Tetra-crates TK by the webs therebetween.

With the embodiment according to FIG. 5, too, the half U-profile longitudinal guides 29 are fixed by their bases 31 to the pillars 28 (only one shown) via the supports 27 (only one shown) or the supporting beam 1 and each other by the seams 32 (only one shown). The free edges of the legs 30, however, extend from the bases 31 into the U-shaped supports 5 in the legs of the U-shaped supporting beams 3, as with the embodiment of FIG. 4.

With the embodiment according to FIG. 5, where the half U-profile longitudinal guides 29 are connected to each other between the storage tracks O by the seam 32, the central support 33 of FIG. 4 has been left out.

With the embodiment according to FIG. 5, the conveyors at 2 have to be supported on the consoles 26 to make room for the cross beams of the Tetra-crates TK, which cannot rest on the supporting beams 1 during both storage and conveyance. However, in the embodiment according to FIG. 4, the conveyors at 2 are also supported on consoles 26 on the supporting beams.

Between the conveyors at 2 of each storage track at O according to both FIGS. 4 and 5, gutter-shaped profiles 34 are placed on the supporting beams 1, as well as with the embodiment according to FIG. 1, said profiles being secured in the same way as the gutter-shaped profiles 2a (FIG. 1), which have the same function.

The embodiment of the conveyor device according to FIG. 4 may be easily transformed into the embodiment according to FIG. 5, and the other way round, by simply mounting the half U-profiles of the longitudinal guides 29 in reversed position. Added to this, the half U-profile longitudinal guides 29 between the storage tracks at O in FIG. 4 may also be replaced by the effectively one-piece, seamed longitudinal guide according to FIG. 5, in which case, the central support 33 may be left out.

The embodiments according to FIGS. 4 and 5 thus make it very easy to change from the block-shaped crates B to the Tetra-crates TK, and the other way round.

Figure 6:
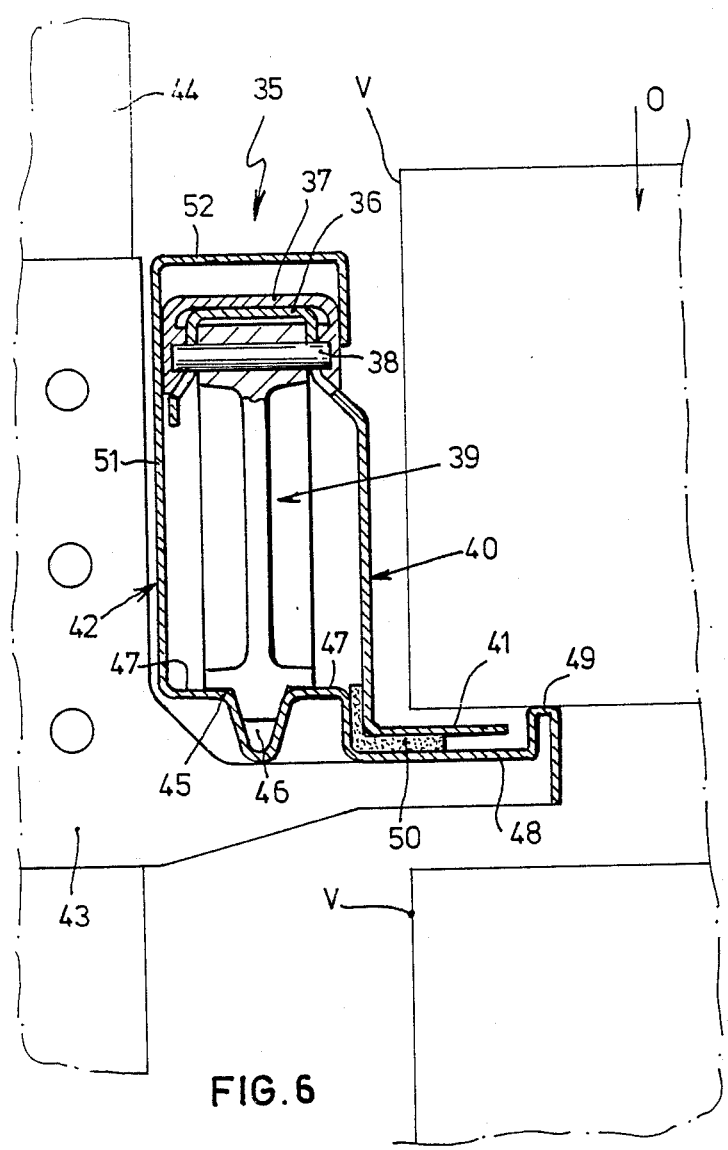
FIG. 6 is a front cross-sectional view of a portion of a fourth embodiment of the conveyor device according to the invention, only the left conveyor of the conveyor device, which has another, mirror-image, right conveyor, being shown.

FIG. 6 shows a transverse cross-section of the left conveyor at 35 of a third embodiment of a conveyor device according to the invention and, therefore, consisting of two conveyors. The conveyor at 35 is a step conveyor, which is provided with a U-shaped conveyor beam 36 with a conveyor slide surface 37 on its top and toppling cams 39 at its underside, which toppling cams 39 are pivotably mounted on shafts 38. So far, therefore, its construction is equivalent to that of the embodiment according to FIGS. 1, 2 and 3.

The conveyor beam 36 according to FIG. 6 is, however, provided on one side with an L-shaped conveyor part 40 having a conveyor face 41 for the objects V, which are situated, therefore, adjacent this side of the conveyor which faces the other, right conveyor (not shown). The conveyor face 41 lies at a lower level than the upperside of the conveyor at 35.

The conveyor 35 furthermore consists of an L-shaped supporting beam 42, which is supported on an L-shaped console 43, which is attached to a vertical pillar 44 of the rack. The supporting beam 42 has a bottom 45, which has the V-shaped groove 46, which is flanked by the guide faces 47. The bottom 45 at the side of the conveyor with the supporting face 41 is also provided with a carrier 48 having a supporting face 49 on which rest the objects V to be conveyed. Between the L-shaped conveyor part 40 and its conveyor surface 41 and the carrier 48 is a slide cushion 50.

At the upperside of the vertical leg 51 of the supporting beam 42 is a reversible U-shaped cover 52, which guides the upperside 37 of the conveyor beam 36 and covers it at the same time.

The construction of the not-drawn right conveyor corresponds to that shown in FIG. 6, but in mirror image.

The operation of the step conveyors 35 corresponds to that of the step conveyors according to the FIGS. 1, 2 and 3, with the addition that, during the reversed or non-acting stroke of the conveyor beam, the L-shaped conveyor part 40 is guided and supported by the slide cushion 50 on the carrier 48.

With the conveyor device according to FIG. 6, a considerable space-saving in height is achieved for accommodating the objects V to be conveyed.

I claim:

1. In a storage rack having a plurality of stories and a plurality of storage tracks side by side in each story, each storage track having a conveyor device, an improved conveyor device, comprising:

two, separate and independently operable conveyors spaced from each other, each having a conveying surface for conveying an object on top thereof, whereby the object is conveyingly supported at correspondingly spaced locations; and a longitudinal guide on the outer side of each conveyor with respect to the other conveyor, each longitudinal guide extending downwardly of the conveying surface of the conveyor thereof for guiding a correspondingly extending portion of the object conveyed;

wherein each conveyor is a step conveyor (2) comprising a U-shaped supporting beam (3) having upwardly extending legs (4) and a base (8) therebetween, supporting faces (6) for the objects (V) to be conveyed on the legs (4), a V-shaped groove (9) in the base flanked by slide surfaces (10), an inverted U-shaped conveyor beam (11, 12) having legs, toppling cams (14) pivotably mounted between the legs of the conveyor beam, a spiral engaging member (15) on each toppling cam which cooperates with the V-shaped groove (9), and slide faces (16, 17) at opposite ends of the spiral engaging member which cooperate with the slide surfaces (10).

2. The conveyor device according to claim 1, wherein the longitudinal guides (29, 32) are reversible for the longitudinal guides to extend upwardly of the conveying surface when reversed.

3. The conveyor device according to claim 2, wherein the reversible longitudinal guides each comprise a leg (30) and further comprise a base (29) in half of a U-shaped profile with the leg (30) being resiliently movable with respect to the base (29).

4. The conveyor device according to claim 3, wherein the legs of two adjacent reversible longitudinal guides of half a U-shaped profile (29) are connected to each other to form a one-piece U-shaped profile (32).

5. Conveyor device according to claim 1, which consists of two separate conveyors, characterized in that the conveyor face (41) and the supporting face (47) of each conveyor (35) is next to and at the side of the conveyor, which is turned to the other conveyor and lies at a lower level than the upper side of the conveyor.

6. The conveyor device according to claim 1, wherein the slide faces (16, 17) of the toppling cams (14) enclose an angle of from 90° to 135°.

7. The conveyor device according to claim 1, wherein the spiral engaging member (15) has a trapezium-shaped transverse cross section with convex flanks and a longitudinal logarithmic spiral curve.

* * * * *